3,101,356
19-HALO ANDROSTENES
Albert Bowers, Mexico City, Mexico, assignor to Syntex Corporation, Panama, Panama, a corporation of Panama
No Drawing. Filed June 12, 1962, Ser. No. 201,799
Claims priority, application Mexico Mar. 13, 1962
23 Claims. (Cl. 260—397.4)

The present invention relates to novel cyclopentanophenanthrene derivatives and to a process for the production thereof.

More particularly, the present invention relates to novel 19-halo-$\Delta^4$-androsten-17$\beta$-ol-3-one derivatives.

The novel compounds of the present invention are represented by the following formulas:

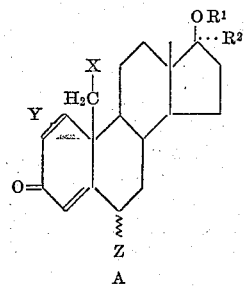
A

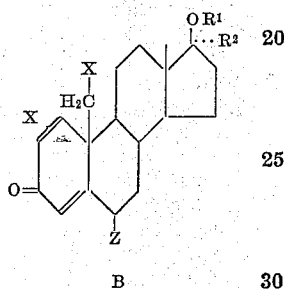
B

In the above formulas $R^1$ represents hydrogen or a hydrocarbon carboxylic acyl group of less than 12 carbon atoms; $R^2$ represents hydrogen, lower alkyl, lower alkenyl or lower alkinyl; Z represents hydrogen, methyl, chlorine or fluorine, all having $\alpha$ or $\beta$ configurations in Formula A; Y represents a double bond or a saturated linkage each between C–1 and C–2; and X represents chlorine or fluorine.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The compounds represented by the above formulas have anabolicandrogenic properties, and inhibit the production of pituitary gonadotrophic hormones and A.C.T.H. In addition, they exhibit anti-estrogenic activity and lower the blood, liver and adrenal cholesterol levels. Furthermore, they are very useful in the control of fertility and psychotic conditions, and stimulate the appetite.

The novel compounds of the present invention are prepared by the process exemplified as follows:

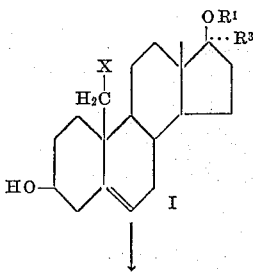
I

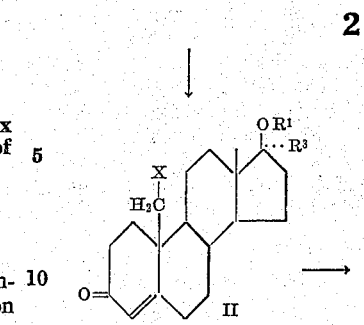

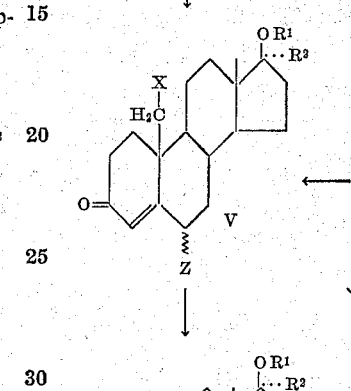

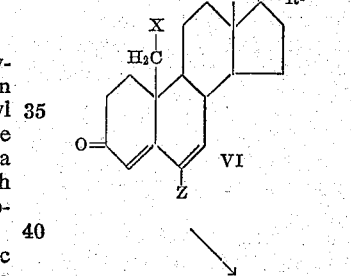

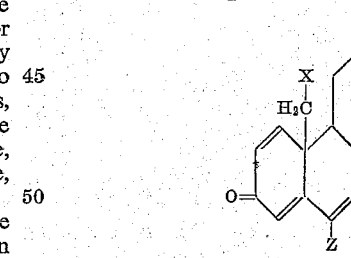

In the above formulas $R^1$, $R^2$, X and Z have the same meaning as previously set forth; $R^3$ represents hydrogen, lower alkyl or lower alkinyl.

In practicing the process outlined above, the starting compound which is a 17$\alpha$-unsubstituted-17$\beta$-acyloxy-19-halo-$\Delta^5$-androsten-3$\beta$-ol (I: $R^1$=acyl, $R^3$=H) is treated under conventional Oppenauer conditions to produce the corresponding 17$\alpha$-unsubstituted-17$\beta$-acyloxy-19-halo-$\Delta^4$-androsten-3-one (II: $R^1$=acyl, $R^3$=H) which upon conventional saponification with a base yields the corresponding 17$\alpha$-unsubstituted-19-halo-$\Delta^4$-androsten-17$\beta$-ol-3-one (II: $R^1$=$R^3$=H).

The 17$\alpha$-substituted starting compounds [I: $R^3$=lower (alkyl or alkinyl)] may have a 17$\beta$-free hydroxyl, and when treated under conventional Oppenauer conditions, there is afforded the corresponding 17$\alpha$-substituted-19-halo-$\Delta^4$-androsten-17$\beta$-ol-3-one derivatives [II: $R^3$=lower (alkyl or alkinyl)].

The $\Delta^4$-3-ketones (II) upon reaction with ethyleneglycol, in the presence of p-toluenesulfonic acid yield the corresponding 3 - cycloethylenedioxy - Δ⁵ - androstene compounds (III) which upon treatment with an organic peracid, such as monoperphthalic acid, in a suitable solvent, e.g. chloroform, give the corresponding 3-cycloethylenedioxy-19-halo-5α,6α-oxido derivatives (IV).

Upon reaction of the latter 3-cycloethylenedioxy-5α,6α-oxido compounds with methyl magnesium bromide in an inert solvent, such as ether or tetrahydrofuran, followed by conventional working up and treatment of the resulting residues with a mineral acid, such as 8% sulfuric acid, and thereafter with thionyl chloride in pyridine at about −10° C. for approximately 4 minutes, there are obtained the corresponding 19-halo-6β-methyl-Δ⁴-androsten-17β-ol-3-one direvatives (V: Z=β-methyl). These 6β-methyl derivatives are converted into the corresponding 6α-methyl derivatives (V: Z=α-methyl) by treatment with an alkali metal hydroxide.

When treating the 3-cycloethylenedioxy-5α,6α-oxido compounds (IV) with anhydrous hydrogen chloride in a suitable organic solvent, e.g. ethyl acetate or acetic acid, there are produced the corresponding 6α-chloro-19-halo-Δ⁴-androsten-17β-ol-3-one derivatives (V: Z=α-chlorine).

Upon reaction of the 3-cycloethylenedioxy-5α,6α-oxido compounds (IV) with anhydrous hydrogen fluoride, preferably in the presence of boron trifluoride etherate, followed by treatment with hydrogen chloride, there are produced the corresponding 6α-fluoro-19-halo-Δ⁴-androsten-17β-ol-3-one derivatives (V: Z=α-fluorine).

The 19-halo-Δ⁴-androsten-17β-ol-3-one derivatives (II) are treated with ethyl orthoformate in the presence of p-toluenesulfonic acid and in an inert solvent, thus affording the corresponding -19-halo-3-ethoxy-Δ³,⁵-androstadien-17β-ol derivatives, which upon reaction with approximately 1 molar equivalent of an N-chloro amide or imide, such as N-chloro succinimide in the presence of sodium acetate and acetic acid yield the corresponding 6β-chloro-19-halo-Δ⁴-androsten-17β-ol-3-one derivatives (V: Z=β-chlorine).

The aforesaid 19-halo-3-ethoxy-Δ³,⁵-androstadiene-17β-ol derivatives are treated with perchloryl fluoride in dimethyl formamide to produce the corresponding 6β-fluoro-19-halo-Δ⁴-androsten - 17β - ol - 3 - one derivatives (V: Z=β-fluorine).

The 19-halo-17α-alkinyl-Δ⁴-androsten-17β - ol - 3 - one compounds of the present invention (V: R²=alkinyl) are converted into the corresponding 19-halo-17α-alkenyl-Δ⁴-androsten-17β-ol-3-one derivatives (V: R²=alkenyl), by hydrogenation with approximately 1 molar equivalent of hydrogen, in pyridine solution in the presence of a suitable catalyst, such as 2% palladium on calcium carbonate at room temperature and under a pressure of about 1 atmosphere.

The 19-halo-Δ⁴-androsten-17β-ol-3-one compounds of the present invention (V) upon treatment with ethyl orthoformate in an inert solvent, e.g. dioxane, and in the presence of p-toluenesulfonic acid, furnish the corresponding 19-halo-3-ethoxy-Δ³,⁵-androstadiene derivatives, which are treated with approximately 1 molar equivalent of 2,3-dichloro-5,6-dicyano-1,4-benzoquinone, in the presence of a catalytic amount of acid and in an inert solvent to give the corresponding 19-halo-Δ⁴,⁶-androstadien-17β-ol-3-one derivatives (VI).

When treating the 19-halo-Δ⁴-androsten-17β-ol-3-one compounds (V) with 2,3-dichloro-5,6-dicyano-1,4-benzoquinone in an inert solvent such as dioxane, preferably at reflux temperature, for a period of time of about 10 hours, there are produced the corresponding 19-halo-Δ¹,⁴-androstadien-17β-ol-3-one compounds (VII).

The aforesaid Δ⁴,⁶-androstadiene compounds (VI) are converted into the corresponding Δ¹,⁴,⁶-androstatriene derivatives by further treatment with 2,3-dichloro-5,6-dicyano-1,4-benzoquinone, under the same conditions as specified hereinbefore, for the production of the Δ¹,⁴-derivatives (VI).

The compounds of the present invention having a secondary hydroxyl, namely the 17α-unsubstituted-17β-alcohols are conventionally acylated in pyridine with an acylating agent, such as an anhydride or an acyl chloride derived from hydrocarbon carboxylic acids of the previously defined type, to produce the corresponding acylates.

The compounds of the present invention having a tertiary hydroxyl present in the molecule, i.e. the 17α-substituted-17β-alcohols, are conventionally esterified, in the presence of p-toluenesulfonic acid with an acylating agent such as acetic anhydride or caproic anhydride, thus affording the corresponding esters.

The following specific examples serve to illustrate, but are not intended to restrict the scope of the present invention.

PREPARATION 1

2 cc. of dihydropyrane were added to a solution of 1 g. of 19-fluoro-Δ⁵-androsten-3β-ol-17-one (obtained in accordance with my copending U.S. patent application Serial No. 201,803, filed of even date, by treating Δ⁵-androstene-3β-19-diol-17-one 3 acetate disclosed in my U.S. Patent No. 3,065,228, with an α-fluorinated amine or with tosyl chloride followed by reaction with an alkali metal fluoride and further conventional saponification of the ester group) in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of 19-fluoro-Δ⁵-androsten-3β-ol-17-one.

A solution of 1 g. of sodium borohydride in 3 cc. of water was added to an ice-cooled solution of 1 g. of the latter product in 120 cc. of methanol and the mixture was allowed to stand for 6 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give the 3-tetrahydropyranylether of 19-fluoro-Δ⁵-androstene-3β,17β-diol.

A mixture of the latter compound, 4 cc. of pyridine and 2 cc. of acetic anhydride was kept at room temperature overnight, poured into ice water, the formed precipitate was filtered, washed with water and dried. Crystallization from acetone-hexane gave the 3-tetrahydropyranlyether-17 -acetate of 19-fluoro-Δ⁵-androstene-3β,17β-diol.

A solution of 500 mg. of the last-named steroid in 25 cc. of acetone was treated with 1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave the 17-acetate of 19-fluoro-Δ⁵-androstene-3β,17β-diol.

19-chloro-Δ⁵-androsten-3β-ol-17-one (obtained in accordance with the aforesaid patent application) was treated following the above procedures, thus affording the 17-acetate of 19-chloro-Δ⁵-androstene-3β,17β-diol.

Example 1

A solution of 1 g. of the 17-acetate of 19-fluoro-Δ⁵-androstene-3β,17β-diol in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 20 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded the acetate of 19-fluoro-$\Delta^4$-androsten-17$\beta$-ol-3-one (Compound No. 1).

The 17-acetate of 19-chloro-$\Delta^5$-androstene-3$\beta$,17$\beta$-diol was treated by the same procedure thus affording (Compound No. 2), namely, the acetate of 19-chloro-$\Delta^4$-androsten-17$\beta$-ol-3-one.

Example II

A suspension of 1 g. of the acetate of 19-fluoro-$\Delta^4$-androsten-17$\beta$-ol-3-one (Compound No. 1) in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 19-fluoro-$\Delta^4$-androsten-17$\beta$-ol-3-one (Compound No. 3).

The acetate of 19-chloro-$\Delta^4$-androsten-17$\beta$-ol-3-one (Compound No. 2) was treated in accordance with the above procedure, thus affording 19-chloro-$\Delta^4$-androsten-17$\beta$-ol-3-one (Compound No. 4).

The compounds listed under A (obtained in accordance with the aforesaid patent application) were treated according to Example I, thus affording the corresponding compounds set forth under B.

| A | Compound No. | B |
|---|---|---|
| 19-fluoro-17$\alpha$-methyl-$\Delta^5$-androstene-3$\beta$,17$\beta$-diol. | 5 | 19-fluoro-17$\alpha$-methyl-$\Delta^4$-androsten-17$\beta$-ol-3-one. |
| 19-chloro-17$\alpha$-methyl-$\Delta^5$-androstene-3$\beta$,17$\beta$-diol. | 6 | 19-chloro-17$\alpha$-methyl-$\Delta^4$-androsten-17$\beta$-ol-3-one. |
| 19-fluoro-17$\alpha$-ethinyl-$\Delta^5$-androstene-3$\beta$,17$\beta$-diol. | 7 | 19-fluoro-17$\alpha$-ethinyl-$\Delta^4$-androsten-17$\beta$-ol-3-one. |
| 19-chloro-17$\alpha$-ethinyl-$\Delta^5$-androstene-3$\beta$,17$\beta$-diol. | 8 | 19-chloro-17$\alpha$-ethinyl-$\Delta^4$-androsten-17$\beta$-ol-3-one. |

Example III

A mixture of 5 g. of 19-fluoro-$\Delta^4$-androsten-17$\beta$-ol-3-one (Compound No. 3), 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3-cycloethylenedioxy-19-fluoro-$\Delta^5$-androsten-17$\beta$-ol (Compound No. 9).

Following the same procedure, there were treated the Compound Nos. 4 to 8, inclusive, thus affording respectively:

Compound No.:
  (10) 3-cycloethylenedioxy-19-chloro-$\Delta^5$-androsten-17$\beta$-ol
  (11) 3-cycloethylenedioxy-19-fluoro-17$\alpha$-methyl-$\Delta^5$-androsten-17$\beta$-ol
  (12) 3-cycloethylenedioxy-19-chloro-17$\alpha$-methyl-$\Delta^5$-androsten-17$\beta$-ol
  (13) 3-cycloethylenedioxy-19-fluoro-17$\alpha$-ethinyl-$\Delta^5$-androsten-17$\beta$-ol
  (14) 3-cycloethylenedioxy-19-chloro-17$\alpha$-ethinyl-$\Delta^5$-androsten-17$\beta$-ol

Example IV

A solution of 2.5 g. of 3-cycloethylenedioxy-19-fluoro-$\Delta^5$-androsten-17$\beta$-ol (Compound No. 9) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3-cycloethylenedioxy-19-fluoro-5$\alpha$,6$\alpha$-oxido-androstan-17$\beta$-ol (Compound No. 15).

The Compounds Nos. 10 to 14, inclusive, were treated following the above procedure, thus furnishing respectively:

Compound No.:
  (16) 3-cycloethylenedioxy-19-chloro-5$\alpha$,6$\alpha$-oxido-androstan-17$\beta$-ol
  (17) 3-cycloethylenedioxy-19-fluoro-17$\alpha$-methyl-5$\alpha$,6$\alpha$-oxido-androstan-17$\beta$-ol
  (18) 3-cycloethylenedioxy-19-chloro-17$\alpha$-methyl-5$\alpha$,6$\alpha$-oxido-androstan-17$\beta$-ol
  (19) 3-cycloethylenedioxy-19-fluoro-17$\alpha$-ethinyl-5$\alpha$,6$\alpha$-oxido-androstan-17$\beta$-ol
  (20) 3-cycloethylenedioxy-19-chloro-17$\alpha$-ethinyl-5$\alpha$,6$\alpha$-oxido-androstan-17$\beta$-ol

Example V

To a solution of 20 cc. of 4 N methylmagnesium bromide in ether was added, with stirring, a solution of 1 g. of 3-cycloethylenedioxy-19-fluoro-5$\alpha$,6$\alpha$-oxido-androstan-17$\alpha$-ol (Compound No. 15) in 30 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 200 cc. of a saturated solution of ammonium chloride was added slowly to the cooled mixture which was then stirred for 15 minutes before transfer to a separatory funnel. It was diluted with ethyl acetate, the organic layer was separated, dried and evaporated to dryness, thus affording a solid residue.

A solution of the above residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off, washed thoroughly with water and air dried.

A solution of the dry precipitate in 7 cc. of dry pyridine was cooled to $-10°$ C., treated with 0.4 cc. of thionyl chloride and the mixture allowed to stand for 4 minutes at this temperature. Ice-water was added and the crystalline precipitate was filtered, washed and dried, yielding 19-fluoro-6$\beta$-methyl-$\Delta^4$-androsten-17$\beta$-ol-3-one (Compound No. 21).

The Compounds Nos. 16 to 20, inclusive, were treated by the above procedure, thus furnishing respectively:

Compound No.:
  (22) 19-chloro-6$\beta$-methyl-$\Delta^4$-androsten-17$\beta$-ol-3-one
  (23) 19-fluoro-6$\beta$,17$\alpha$-dimethyl-$\Delta^4$-androsten-17$\beta$-ol-3-one
  (24) 19-chloro-6$\beta$,17$\alpha$-dimethyl-$\Delta^4$-androsten-17$\beta$-ol-3-one
  (25) 19-fluoro-6$\beta$-methyl-17$\alpha$-ethinyl-$\Delta^4$-androsten-17$\beta$-ol-3-one
  (26) 19-chloro-6$\beta$-methyl-17$\alpha$-ethinyl-$\Delta^4$-androsten-17$\beta$-ol-3-one

Example VI 1 g. of 19-fluoro-6$\beta$-methyl-$\Delta^4$-androsten-17$\beta$-ol-3-one (Compound No. 21) was dissolved in 20 cc. of methanol containing 0.2 g. of sodium hydroxide and the mixture was kept for one and a half hours at room temperature, then poured into water and extracted with methylene chloride. Evaporation of the methylene chloride solution and crystallization of the residue from acetone-hexane yielded 19-fluoro-6$\alpha$-methyl-$\Delta^4$-androsten-17$\beta$-ol-3-one (Compound No. 27).

Following the same procedure, the Compounds Nos. 22 to 26, inclusive, were converted respectively into:

Compound No.:
(28) 19-chloro-6α-methyl-Δ⁴-androsten-17β-ol-3-one
(29) 19-fluoro-6α,17α-dimethyl-Δ⁴-androsten-17β-ol-3-one
(30) 19-chloro-6α,17α-dimethyl-Δ⁴-androsten-17β-ol-3-one
(31) 19-fluoro-6α-methyl-17α-ethinyl-Δ⁴-androsten-17β-ol-3-one
(32) 19-chloro-6α-methyl-17α-ethinyl-Δ⁴-androsten-17β-ol-3-one

*Example VII*

Into a suspension of 1 g. of 3-cycloethylenedioxy-19-fluoro-5α,6α-oxido-androstan-17β-ol (Compound No. 15) in 35 cc. of glacial acetic acid, was passed a slow stream of dry hydrochloric acid; after 10 minutes all the solid material was dissolved. The gas was passed through the reaction mixture for a total of 5 hours. The solution was concentrated to about one-third its initial volume by distillation under reduced pressure at 35° C., then it was poured into ice-water. The precipitate formed was collected, washed with water to neutrality and dried. Recrystallization from methylene chloride afforded 6α-chloro-19-fluoro-Δ⁴-androsten-17β-ol-3-one (Compound No. 33).

The Compounds Nos. 16 to 20, inclusive, were treated by the above procedure, thus yielding correspondingly:

Compound No.:
(34) 6α,19-dichloro-Δ⁴-androsten-17β-ol-3-one
(35) 6α-chloro-19-fluoro-17α-methyl-Δ⁴-androsten-17β-ol-3-one
(36) 6α,19-dichloro-17α-methyl-Δ⁴-androsten-17β-ol-3-one
(37) 6α-chloro-19-fluoro-17α-ethinyl-Δ⁴-androsten-17β-ol-3-one
(38) 6α,19-dichloro-17α-ethinyl-Δ⁴-androsten-17β-ol-3-one

*Example VIII*

2.8 cc. of boron trifluoride etherate was slowly added with stirring to 220 mg. of anhydrous hydrogen fluoride cooled in an acetone-Dry Ice bath.

To a solution of 1 g. of Compound No. 15 in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was dissolved in 50 cc. of ethyl acetate and there was added 1 cc. of concentrated hydrochloric acid. The resulting mixture was kept at room temperature for 5 hours, then it was washed abundantly with water. The organic layer was separated, dried over anhydrous sodium sulfate and evaporated to dryness. Recrystallization from acetone-hexane yielded 6α,19-difluoro-Δ⁴-androsten-17β-ol-3-one (Compound No. 39).

The Compounds Nos. 16 to 20, inclusive, were treated by the above procedure, thus affording respectively:

Compound No.:
(40) 6α-fluoro-19-chloro-Δ⁴-androsten-17β-ol-3-one
(41) 6α,19-difluoro-17α-methyl-Δ⁴-androsten-17β-ol-3-one
(42) 6α-fluoro-19-chloro-17α-methyl-Δ⁴-androsten-17β-ol-3-one
(43) 6α,19-difluoro-17α-ethinyl-Δ⁴-androsten-17β-ol-3-one
(44) 6α-fluoro-19-chloro-17α-ethinyl-Δ⁴-androsten-17β-ol-3-one

*Example IX*

A suspension of 1 g. of 19-fluoro-Δ⁴-androsten-17β-ol-3-one (Compound No. 3) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 3-ethoxy-19-fluoro-Δ³,⁵-androstadien-17β-ol (Compound No. 45).

The Compounds Nos. 4 to 8, inclusive, were treated by the same procedure, thus furnishing respectively:

Compound No.:
(46) 3-ethoxy-19-chloro-Δ³,⁵-androstadien-17β-ol
(47) 3-ethoxy-19-fluoro-17α-methyl-Δ³,⁵-androstadien-17β-ol
(48) 3-ethoxy-19-chloro-17α-methyl-Δ³,⁵-androstadien-17β-ol
(49) 3-ethoxy-19-fluoro-17α-ethinyl-Δ³,⁵-androstadien-17β-ol
(50) 3-ethoxy-19-chloro-17α-ethinyl-Δ³,⁵-androstadien-17β-ol

*Example X*

A mixture of 5 g. of 3-ethoxy-19-fluoro-Δ³,⁵-androstadien-17β-ol (Compound No. 45), 2 g. of anhydrous sodium acetate and 100 cc. of acetone, was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-19-fluoro-Δ⁴-androsten-17β-ol-3-one (Compound No. 51).

The Compounds Nos. 46 to 50, inclusive, were treated by the above procedure, thus yielding correspondingly:

Compound No.:
(52) 6β,19-dichloro-Δ⁴-androsten-17β-ol-3-one
(53) 6β-chloro-19-fluoro-17α-methyl-Δ⁴-androsten-17β-ol-3-one
(54) 6β,19-dichloro-17α-methyl-Δ⁴-androsten-17β-ol-3-one
(55) 6β-chloro-19-fluoro-17α-ethinyl-Δ⁴-androsten-17β-ol-3-one
(56) 6β,19-dichloro-17α-ethinyl-Δ⁴-androsten-17β-ol-3-one

*Example XI*

1 g. of 3-ethoxy-19-fluoro-Δ³,⁵-androstadien-17β-ol (Compound No. 45) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6β,19-difluoro-Δ⁴-androsten-17β-ol-3-one (Compound No. 57).

Upon treatment of Compounds Nos. 46 to 50, inclusive, by the same procedure, there were respectively produced:

Compound No.:
(58) 6β-fluoro-19-chloro-Δ⁴-androsten-17β-ol-3-one
(59) 6β,19-difluoro-17α-methyl-Δ⁴-androsten-17β-ol-3-one
(60) 6β-fluoro-19-chloro-17α-methyl-Δ⁴-androsten-17β-ol-3-one
(61) 6β,19-difluoro-17α-ethinyl-Δ⁴-androsten-17β-ol-3-one
(62) 6β-fluoro-19-chloro-17α-ethinyl-Δ⁴-androsten-17β-ol-3-one

Example XII

A solution of 1 g. of 19-fluoro-17α-ethinyl-Δ⁴-androsten-17β-ol-3-one (Compound No. 7) in 40 cc. of pyridine was hydrogenated at 25° C. and 570 mm. in the presence of 400 mg. of pre-hydrogenated 2% palladium calcium carbonate catalyst.

When 1.1 molar equivalents of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 19-fluoro-17α-vinyl-Δ⁴-androsten-17β-ol-3-one (Compound No. 63).

Following exactly the same procedure, there were treated the Compounds Nos. 8, 25, 26, 31, 32, 37, 38, 43, 44, 55, 56, 61 and 62, yielding respectively:

Compound No.:
(64) 19-chloro-17α-vinyl-Δ⁴-androsten-17β-ol-3-one
(65) 19-fluoro-6β-methyl-17α-vinyl-Δ⁴-androsten-17β-ol-3-one
(66) 19-chloro-6β-methyl-17α-vinyl-Δ⁴-androsten-17β-ol-3-one
(67) 19-fluoro-6α-methyl-17α-vinyl-Δ⁴-androsten 17β-ol-3-one
(68) 19-chloro-6α-methyl-17α-vinyl-Δ⁴-androsten-17β-ol-3-one
(69) 6α-chloro-19-fluoro-17α-vinyl-Δ⁴-androsten-17β-ol-3-one
(70) 6α,19-dichloro-17α-vinyl-Δ⁴-androsten-17β-ol-3-one
(71) 6α,19-difluoro-17α-vinyl-Δ⁴-androsten-17β-ol-3-one
(72) 6α-fluoro-19-chloro-17α-vinyl-Δ⁴-androsten-17β-ol-3-one
(73) 6β-chloro-19-fluoro-17α-vinyl-Δ⁴-androsten-17β-ol-3-one
(74) 6β,19-dichloro-17α-vinyl-Δ⁴-androsten-17β-ol-3-one
(75) 6β,19-difluoro-17α-vinyl-Δ⁴-androsten-17β-ol-3-one
(76) 6β-fluoro-19-chloro-17α-vinyl-Δ⁴-androsten-17β-ol-3-one

Example XIII

A suspension of 1 g. of 19-fluoro-Δ⁴-androsten-17β-ol-3-one (Compound No. 3) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 3-ethoxy-19-fluoro-Δ³,⁵-androstadien-17β-ol, identical with Compound No. 45 obtained in Example IX.

A solution of 1 g. of the latter compound in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated 2,3-dichloro-5,6-dicyano-hydroquinone was filtered off and 100 cc. of methylene chloride were added to the filtrate.

The organic solution was washed with 5% aqueous sodium hydroxide solution until the washings were colorless, then with water to neutrality, dried over anhydrous sodium sulfate and evaporated to dryness. Crystallization from acetone-hexane gave 19-fluoro-Δ⁴,⁶-androstadien-17β-ol-3-one (Compound No. 77).

The Compounds Nos. 4 to 8, inclusive, were treated following the same procedure, thus yielding respectively:

Compound No.:
(78) 19-chloro-Δ⁴,⁶-androstadien-17β-ol-3-one
(79) 19-fluoro-17α-methyl-Δ⁴,⁶-androstadien-17β-ol-3-one
(80) 19-chloro-17α-methyl-Δ⁴,⁶-androstadien-17β-ol-3-one
(81) 19-fluoro-17α-ethinyl-Δ⁴,⁶-androstadien-17β-ol-3-one
(82) 19-chloro-17α-ethinyl-Δ⁴,⁶-androstadien-17β-ol-3-one

Example XIV

The Compounds Nos. 21 to 26, inclusive, were treated in accordance with the preceding example, thus affording respectively:

Compound No.:
(83) 19-fluoro-6-methyl-Δ⁴,⁶-androstadien-17β-ol-3-one
(84) 19-chloro-6-methyl-Δ⁴,⁶-androstadien-17β-ol-3-one
(85) 19-fluoro-6,17α-dimethyl-Δ⁴,⁶-androstadien-17β-ol-3-one
(86) 19-chloro-6,17α-dimethyl-Δ⁴,⁶-androstadien-17β-ol-3-one
(87) 19-fluoro-6-methyl-17α-ethinyl-Δ⁴,⁶-androstadien-17β-ol-3-one
(88) 19-chloro-6-methyl-17α-ethinyl-Δ⁴,⁶-androstadien-17β-ol-3-one

Example XV

Upon treatment of Compounds Nos. 33 to 44, inclusive, by the procedure of Example XIII, there were respectively produced:

Compound No.:
(89) 6-chloro-19-fluoro-Δ⁴,⁶-androstadien-17β-ol-3-one
(90) 6,19-dichloro-Δ⁴,⁶-androstadien-17β-ol-3-one
(91) 6-chloro-19-fluoro-17α-methyl-Δ⁴,⁶-androstadien-17β-ol-3-one
(92) 6,19-dichloro-17α-methyl-Δ⁴,⁶-androstadien-17β-ol-3-one
(93) 6-chloro-19-fluoro-17α-ethinyl-Δ⁴,⁶-androstadien-17β-ol-3-one
(94) 6,19-dichloro-17α-ethinyl-Δ⁴,⁶-androstadien-17β-ol-3-one
(95) 6,19-difluoro-Δ⁴,⁶-androstadien-17β-ol-3-one
(96) 6-fluoro-19-chloro-Δ⁴,⁶-androstadien-17β-ol-3-one
(97) 6,19-difluoro-17α-methyl-Δ⁴,⁶-androstadien-17β-ol-3-one
(98) 6-fluoro-19-chloro-17α-methyl-Δ⁴,⁶-androstadien-17β-ol-3-one
(99) 6,19-difluoro-17α-ethinyl-Δ⁴,⁶-androstadien-17β-ol-3-one
(100) 6-fluoro-19-chloro-17α-ethinyl-Δ⁴,⁶-androstadien-17β-ol-3-one

Example XVI

The Compounds Nos. 63 and 64 were treated according to Example XIII, thus furnishing respectively: 19-fluoro-17α-vinyl-Δ⁴,⁶-androstadien-17β-ol-3-one (Compound No. 101).

Example XVII

A mixture of 500 mg. of 19-fluoro-Δ⁴-androsten-17β-ol-3-one (Compound No. 3), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19-fluoro-Δ$^{1,4}$-androstadien-17β-ol-3-one (Compound No. 103).

The Compounds Nos. 4 to 8, inclusive, were treated in accordance with the above procedure, thus furnishing respectively:

Compound No.:
- (104) 19-chloro-Δ$^{1,4}$-androstadien-17β-ol-3-one
- (105) 19-fluoro-17α-methyl-Δ$^{1,4}$-androstadien-17β-ol-3-one
- (106) 19-chloro-17α-methyl-Δ$^{1,4}$-androstadien-17β-ol-3-one
- (107) 19-fluoro-17α-ethinyl-Δ$^{1,4}$-androstadien-17β-ol-3-one
- (108) 19-chloro-17α-ethinyl-Δ$^{1,4}$-androstadien-17β-ol-3-one

*Example XVIII*

The Compounds Nos. 21 to 32, inclusive, were treated in accordance with the preceding example, thus affording respectively:

Compound No.:
- (109) 19-fluoro-6β-methyl-Δ$^{1,4}$-androstadien-17β-ol-3-one
- (110) 19-chloro-6β-methyl-Δ$^{1,4}$-androstadien-17β-ol-3-one
- (111) 19-fluoro-6β,17α-dimethyl-Δ$^{1,4}$-androstadien-17β-ol-3-one
- (112) 19-chloro-6β,17α-dimethyl-Δ$^{1,4}$-androstadien-17β-ol-3-one
- (113) 19-fluoro-6β-methyl-17α-ethinyl-Δ$^{1,4}$-androstadien-17β-ol-3-one
- (114) 19-chloro-6β-methyl-17α-ethinyl-Δ$^{1,4}$-androstadien-17β-ol-3-one
- (115) 19-fluoro-6α-methyl-Δ$^{1,4}$-androstadien-17β-ol-3-one
- (116) 19-chloro-6α-methyl-Δ$^{1,4}$-androstadien-17β-ol-3-one
- (117) 19-fluoro-6α,17α-dimethyl-Δ$^{1,4}$-androstadien-17β-ol-3-one
- (118) 19-chloro-6α,17α-dimethyl-Δ$^{1,4}$-androstadien-17β-ol-3-one
- (119) 19-fluoro-6α-methyl-17α-ethinyl-Δ$^{1,4}$-androstadien-17β-ol-3-one
- (120) 19-chloro-6α-methyl-17α-ethinyl-Δ$^{1,4}$-androstadien-17β-ol-3-one

*Example XIX*

Upon treatment of Compounds Nos. 33 to 44, inclusive, by the procedure of Example XVII, there were respectively produced:

Compound No.:
- (121) 6α-chloro-19-fluoro-Δ$^{1,4}$-androstadien-17β-ol-3-one
- (122) 6α,19-dichloro-Δ$^{1,4}$-androstadien-17β-ol-3-one
- (123) 6α-chloro-19-fluoro-17α-methyl-Δ$^{1,4}$-androstadien-17β-ol-3-one
- (124) 6α,19-dichloro-17α-methyl-Δ$^{1,4}$-androstadien-17β-ol-3-one
- (125) 6α-chloro-19-fluoro-17α-ethinyl-Δ$^{1,4}$-androstadien-17β-ol-3-one
- (126) 6α,19-dichloro-17α-ethinyl-Δ$^{1,4}$-androstadien-17β-ol-3-one
- (127) 6α,19-difluoro-Δ$^{1,4}$-androstadien-17β-ol-3-one
- (128) 6α-fluoro-19-chloro-Δ$^{1,4}$-androstadien-17β-ol-3-one
- (129) 6α,19-difluoro-17α-methyl-Δ$^{1,4}$-androstadien-17β-ol-3-one
- (130) 6α-fluoro-19-chloro-17α-methyl-Δ$^{1,4}$-androstadien-17β-ol-3-one
- (131) 6α,19-difluoro-17α-ethinyl-Δ$^{1,4}$-androstadien-17β-ol-3-one
- (132) 6α-fluoro-19-chloro-17α-ethinyl-Δ$^{1,4}$-androstadien-17β-ol-3-one

*Example XX*

The Compounds Nos. 63 and 64 were treated according to Example XVII, thus furnishing respectively: 19-fluoro-17α-vinyl-Δ$^{1,4}$-androstadien-17β-ol-3-one (Compound No. 133) and 19-chloro-17α-vinyl-Δ$^{1,4}$-androstadien-17β-ol-3-one (Compound No. 134).

*Example XXI*

The Compounds Nos. 77 to 88, inclusive, upon treatment by the procedure of Example XVII, afforded respectively:

Compound No.:
- (135) 19-fluoro-Δ$^{1,4,6}$-androstatrien-17β-ol-3-one
- (136) 19-chloro-Δ$^{1,4,6}$-androstatrien-17β-ol-3-one
- (137) 19-fluoro-17α-methyl-Δ$^{1,4,6}$-androstatrien-17β-ol-3-one
- (138) 19-chloro-17α-methyl-Δ$^{1,4,6}$-androstatrien-17β-ol-3-one
- (139) 19-fluoro-17α-ethinyl-Δ$^{1,4,6}$-androstatrien-17β-ol-3-one
- (140) 19-chloro-17α-ethinyl-Δ$^{1,4,6}$-androstatrien-17β-ol-3-one
- (141) 19-fluoro-6-methyl-Δ$^{1,4,6}$-androstatrien-17β-ol-3-one
- (142) 19-chloro-6-methyl-Δ$^{1,4,6}$-androstatrien-17β-ol-3-one
- (143) 19-fluoro-6,17α-dimethyl-Δ$^{1,4,6}$-androstatrien-17β-ol-3-one
- (144) 19-chloro-6,17α-methyl-Δ$^{1,4,6}$-androstatrien-17β-ol-3-one
- (145) 19-fluoro-6-methyl-17α-ethinyl-Δ$^{1,4,6}$-androstatrien-17β-ol-3-one
- (146) 19-chloro-6-methyl-17α-ethinyl-Δ$^{1,4,6}$-androstatrien-17β-ol-3-one

*Example XXII*

The Compounds Nos. 101 and 102 of Example XVI were treated in accordance with Example XVII, thus yielding respectively: 19-fluoro-17α-vinyl-Δ$^{1,4,6}$-androstatrien-17β-ol-3-one (Compound No. 147) and 19-chloro-17α-vinyl-Δ$^{1,4,6}$-androstratrien-17β-ol-3-one (Compound No. 148).

*Example XXIII*

The Compounds Nos. 65 to 76, inclusive, were treated in accordance with Example XIII, thus affording the corresponding Δ$^{4,6}$-pregnadiene derivatives.

*Example XXIV*

A mixture of 1 g. of 19-fluoro-6β-methyl-Δ$^4$-androsten-17β-ol-3-one (Compound No. 21), 4 cc. of pyridine and 2 cc. of propionic anhydride was kept at room temperature overnight, poured into ice water, the formed precipitate was filtered, washed with water and dried. Crystallization from acetone-hexane gave 19-fluoro-6β-methyl-Δ$^4$-androsten-17β-ol-3-one propionate (Compound No. 149).

Upon esterification of Compounds Nos. 22, 27, 28, 33, 34, 39, 40, 51, 52, 57, 58, 77, 78, 83, 89, 95, 103, 109, 121 and 135 by the above procedure, there were respectively obtained:

Compound No.:
- (150) 19-chloro-6β-methyl-Δ$^4$-androsten-17β-ol-3-one propionate
- (151) 19-fluoro-6α-methyl-Δ$^4$-androsten-17β-ol-3-one propionate
- (152) 19-chloro-6α-methyl-Δ$^4$-androsten-17β-ol-3-one propionate
- (153) 6α-chloro-19-fluoro-Δ$^4$-androsten-17β-ol-3-one propionate
- (154) 6α,19-dichloro-Δ$^4$-androsten-17β-ol-3-one propionate (155) 6α,19-difluoro-Δ⁴-androsten-17β-ol-3-one propionate
(156) 6α-fluoro-19-chloro-Δ⁴-androsten-17β-ol-3-one propionate
(157) 6β-chloro-19-fluoro-Δ⁴-androsten-17β-ol-3-one propionate
(158) 6β,19-dichloro-Δ⁴-androsten-17β-ol-3-one propionate
(159) 6β,19-difluoro-Δ⁴-androsten-17β-ol-3-one propionate
(160) 6β-fluoro-19-chloro-Δ⁴-androsten-17β-ol-3-one propionate
(161) 19-fluoro-Δ⁴,⁶-androstadien-17β-ol-3-one propionate
(162) 19-chloro-Δ⁴,⁶-androstadien-17β-ol-3-one propionate
(163) 19-fluoro-6-methyl-Δ⁴,⁶-androstadien-17β-ol-3-one propionate
(164) 6-chloro-19-fluoro-Δ⁴,⁶-androstadien-17β-ol-3-one propionate
(165) 6,19-difluoro-Δ⁴,⁶-androstadien-17β-ol-3-one propionate
(166) 19-fluoro-Δ¹,⁴-androstadien-17β-ol-3-one propionate
(167) 19-fluoro-6β-methyl-Δ¹,⁴-androstadien-17β-ol-3-one propionate
(168) 6α-chloro-19-fluoro-Δ¹,⁴-androstadien-17β-ol-3-one propionate
(169) 19-fluoro-Δ¹,⁴,⁶-androstatrien-17β-ol-3-one propionate

*Example XXIV-A*

The starting compounds of the preceding example were treated in accordance with that example, except that propionic anhydride was substituted by caproic anhydride, undecenoic anhydride and cyclopentyl propionic anhydride, thus affording respectively the corresponding caproates, undecenoates and cyclopentyl propionates of said starting compounds.

*Example XXV*

To a solution of 5 g. of 19-fluoro-17α-methyl-Δ⁴-androsten-17β-ol-3-one (Compound No. 5) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-fluoro-17α-methyl-Δ⁴-androsten-17β-ol-3-one caproate (Compound No. 170).

Following exactly the same procedure, there were treated the Compounds Nos. 6, 7, 8, 29, 37, 42, 67, 72, 79, 87, 94, 106, 119, 134 137 140 and 147 thus furnishing respectively:

Compound No.:
(171) 19-chloro-17α-methyl-Δ⁴-androsten-17β-ol-3-one caproate
(172) 19-fluoro-17α-ethinyl-Δ⁴-androsten-17β-ol-3-one caproate
(173) 19-chloro-17α-ethinyl-Δ⁴-androsten-17β-ol-3-one caproate
(174) 19-fluoro-6α,17α-dimethyl-Δ⁴-androsten-17β-ol-3-one caproate
(175) 6α-chloro-19-fluoro-17α-ethinyl-Δ⁴-androsten-17β-ol-3-one caproate
(176) 6α-fluoro-19-chloro-17α-methyl-Δ⁴-androsten-17β-ol-3-one caproate
(177) 19-fluoro-6α-methyl-17α-vinyl-Δ⁴-androsten-17β-ol-3-one caproate
(178) 6α-fluoro-19-chloro-17α-vinyl-Δ⁴-androsten-17β-ol-3-one caproate
(179) 19-fluoro-17α-methyl-Δ⁴,⁶-androstadien-17β-ol-3-one-caproate
(180) 19-fluoro-6-methyl-17α-ethinyl-Δ⁴,⁶-androstadien-17β-ol-3-one caproate
(181) 6,19-dichloro-17α-ethinyl-Δ⁴,⁶-androstadien-17β-ol-3-one caproate
(182) 19-chloro-17α-methyl-Δ¹,⁴-androstadien-17β-ol-3-one caproate
(183) 19-fluoro-6α-methyl-17α-ethinyl-Δ¹,⁴-androstadien-17β-ol-3-one caproate
(184) 19-chloro-17α-vinyl-Δ¹,⁴-androstadien-17β-ol-3-one caproate
(185) 19-fluoro-17α-methyl-Δ¹,⁴,⁶-androstatrien-17β-ol-3-one caproate
(186) 19-chloro-17α-ethinyl-Δ¹,⁴,⁶-androstatrien-17β-ol-3-one caproate
(187) 19-fluoro-17α-vinyl-Δ¹,⁴,⁶-androstatrien-17β-ol-3-one caproate

*Example XXVI*

The starting compounds of the preceding example were treated in accordance with that example, except that caprioc anhydride was substituted by acetic anhydride, propionic anhydride and enanthic anhydride, thus furnishing respectively the corresponding acetates, propionates and enanthates of said starting compounds.

I claim:
1. A compound of the following formula:

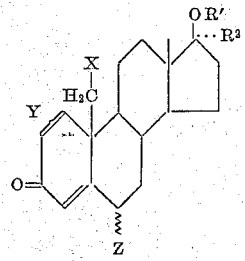

wherein $R^1$ is selected from the group consisting of hydrogen and a hydrocarbon carboxylic acyl group of less than 12 carbon atoms; $R^2$ is a member of the group consisting of hydrogen, lower alkyl, lower alkenyl and lower alkinyl; Z is selected from the group consisting of hydrogen, α-methyl, β-methyl, α-chlorine, β-chlorine, α-fluorine and β-fluorine; Y is a member of the group consisting of a double bond and a saturated linkage between C-1 and C-2; and X is selected from the group consisting of fluorine and chlorine.

2. 19-fluoro-Δ⁴-androsten-17β-ol-3-one.
3. 19-chloro-Δ⁴-androsten-17β-ol-3-one.
4. 19-fluoro-17α-vinyl-Δ⁴-androsten-17β-ol-3-one.
5. 19-chloro-17α-vinyl-Δ⁴-androsten-17β-ol-3-one.
6. 19-chloro-17α-methyl-Δ⁴-androsten-17β-ol-3-one.
7. 19-fluoro-17α-ethinyl-Δ⁴-androsten-17β-ol-3-one.
8. 19-chloro-17α-ethinyl-Δ⁴-androsten-17β-ol-3-one.
9. 19-fluoro-6α,17α-dimethyl-Δ⁴-androsten-17β-ol-3-one.
10. 6α-chloro-19-fluoro-17α-ethinyl-Δ⁴-androsten-17β-ol-3-one.
11. 6α-fluoro-19-chloro-17α-methyl-Δ⁴-androsten-17β-ol-3-one.
12. 19-fluoro-6α-methyl-17α-vinyl-Δ⁴-androsten-17β-ol-3-one.
13. 6α-fluoro-19-chloro-17α-vinyl-Δ⁴-androsten-17β-ol-3-one.
14. 19-chloro-17α-methyl-Δ¹,⁴-androstadien-17β-ol-3-one.
15. 19-fluoro-6α-methyl-17α-ethinyl-Δ¹,⁴-androstadien-17β-ol-3-one.
16. 19-chloro-17α-vinyl-Δ¹,⁴-androstadien-17β-ol-3-one.

17. A compound of the following formula:

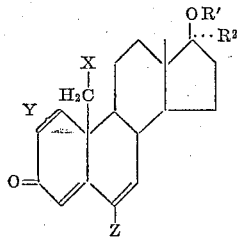

wherein $R^1$ is selected from the group consisting of hydrogen and a hydrocarbon carboxylic acyl group of less than 12 carbon atoms; $R^2$ is a member of the group consisting of hydrogen, lower alkenyl and lower alkinyl; Z is selected from the group consisting of hydrogen, methyl, chlorine, and fluorine; Y is a member of the group consisting of a double bond and a saturated linkage between C–1 and C–2; and X is selected from the group consisting of fluorine and chlorine.

18. 19 - fluoro - $17\alpha$ - methyl - $\Delta^{4,6}$ - androstadien - $17\beta$-ol-3-one.

19. 19 - fluoro - 6 - methyl - $17\alpha$ - ethinyl - $\Delta^{4,6}$ - androstadien-$17\beta$-ol-3-one.

20. 6,19 - dichloro - $17\alpha$ - ethinyl - $\Delta^{4,6}$ - androstadien-$17\beta$-ol-3-one.

21. 19 - fluoro - $17\alpha$ - methyl - $\Delta^{1,4,6}$ - androstatrien-$17\beta$-ol-3-one.

22. 19 - chloro - $17\alpha$ - ethinyl - $\Delta^{1,4,6}$ - androstatrien-$17\beta$-ol-3-one.

23. 19 - fluoro - $17\alpha$ - vinyl - $\Delta^{1,4,6}$ - androstatrien - $17\beta$-ol-3-one.

References Cited in the file of this patent

Mills et al.: Chem. and Ind., June 24, 1961, page 946.